Nov. 21, 1967  P. M. WECHSELBLATT ET AL  3,353,803
GAS QUENCHER
Filed May 9, 1967
3 Sheets-Sheet 1

JOHN G. BORESTA
PETER M. WECHSELBLATT
INVENTORS.

BY *J. T. Chaberty*
AGENT

JOHN G. BORESTA
PETER M. WECHSELBLATT
INVENTORS.

JOHN G. BORESTA
PETER M. WECHSELBLATT
INVENTORS

United States Patent Office 3,353,803
Patented Nov. 21, 1967

3,353,803
GAS QUENCHER
Peter M. Wechselblatt, New York, N.Y., and John G. Boresta, West Englewood, N.J., assignors to Chemical Construction Corporation, New York, N.Y., a corporation of Delaware
Filed May 9, 1967, Ser. No. 637,250
12 Claims. (Cl. 261—116)

ABSTRACT OF THE DISCLOSURE

Gas quenching apparatus is provided which produces wetted-wall transfer and spray quenching of a hot solids-laden gas stream. The apparatus includes an inverted frusto-conical baffle quenching section with a wetted-wall approach, and a lower wetted-wall section which is provided with a bottom liquid retention chamber in which a body of liquid is retained to remove entrained liquid droplets and solids from the gas stream.

Background of the invention

Figure 1:
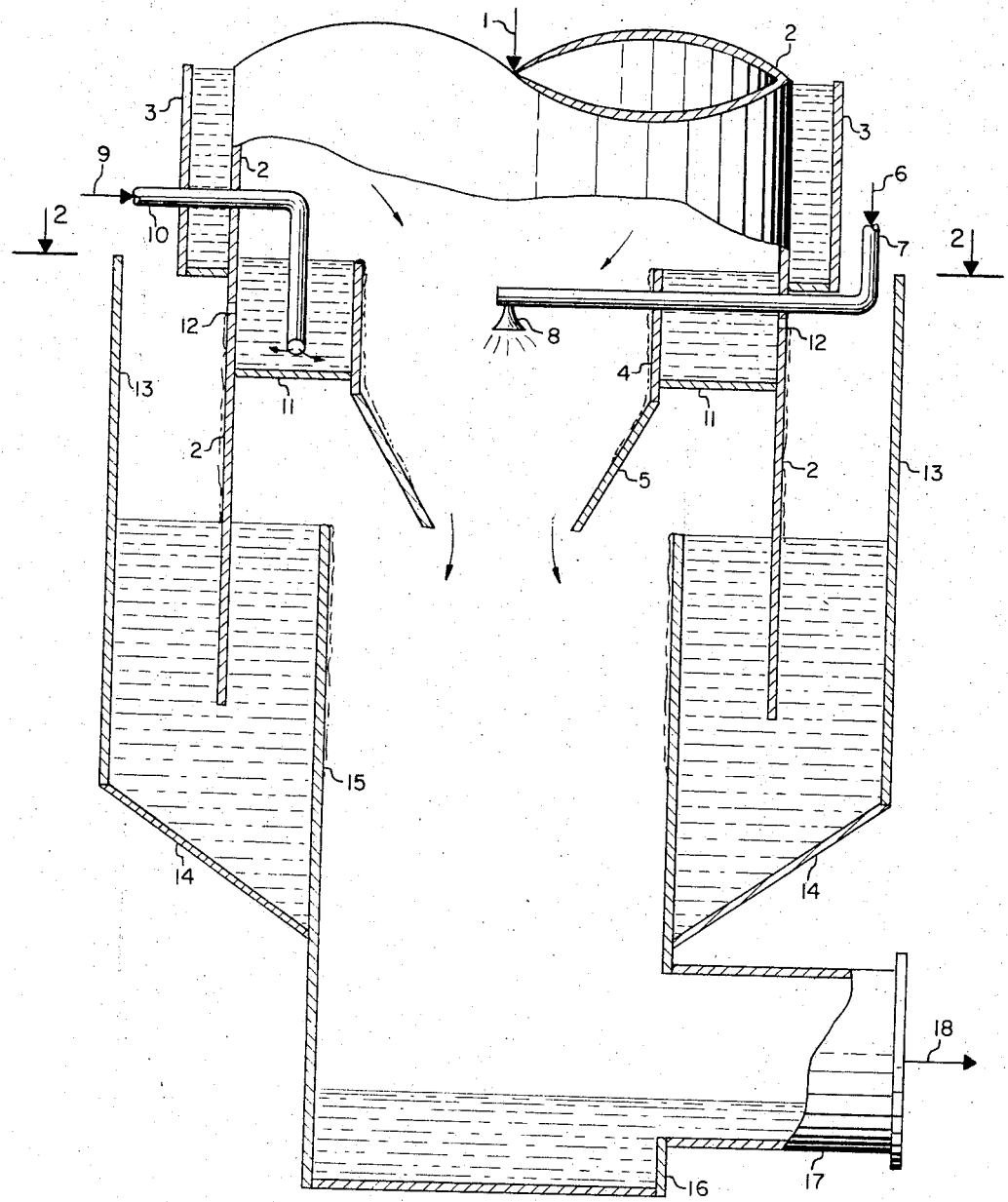

*Field of the invention.*—The invention relates to the quenching or quench-scrubbing of hot solids-laden gas streams discharged from furnaces or other gas sources, and is particularly applicable to the quenching with liquid water of the hot gas stream discharged from a cupola or electric furnace. The present apparatus invention provides an improved modification of the venturi-type gas scrubbing system.

*Description of the prior art.*—Numerous prior art disclosures concern the quenching or scrubbing of a hot gas stream by the spraying or injection of liquid such as water into the gas stream. Among those disclosures which involve the provision of a frusto-conical type of passage for restricted gas flow and acceleration during quenching are U.S. Patents Nos. 3,317,197, 3,085,793, 3,131,237, 3,262,685 and 3,212,761. The basic concept of accelerating a gas in a venturi passage and projecting water transversely to the accelerated gas stream at the venturi throat is disclosed in U.S. Patents Nos. 2,604,185 and 2,883,167. Variations and improvements on the venturi configuration are disclosed in U.S. Patents Nos. 2,684,836, 3,138,-441, 3,138,442, 3,138,647 and 3,142,548.

Summary of the invention

The present invention relates to quenching of a hot solids-laden off-gas discharged from a furnace such as a cupola or electric furnace, or generated from other hot gas sources such as an ore roaster or incinerator. The hot gas is effectively quenched in an apparatus which provides a wetted wall vertical approach conduit to an inverted frusto-conical baffle quencher of venturi inlet configuration. A central downwards spray of water is provided in the approach conduit, and further water contact is attained by the projection of the wetted-wall liquid film from the lower end of the baffle and into the gas stream. A lower vertical wetted-wall conduit is also provided below the outlet of the baffle, and the mixture of quenched gas and excess water droplets passes downwards through this lower conduit and then flows horizontally above a lower liquid retention chamber or flooded elbow at the bottom of the lower conduit. The final mixture of quenched and scrubbed gas together with excess liquid water passes to suitable disposal means, such as a gas-liquid gravity separator.

The principal advantage of the present invention is that hot off-gas is effectively and uniformly quenched to a lower temperature, and this result is obtained with only very minor gas pressure drop or loss of gas static head. Another advantage is that all surfaces exposed to the wetted gas stream are wetted-wall or liquid-irrigated surfaces, and consequently the deposition or caking of solids from the gas stream is effectively prevented. A further advantage is that the mixture of quenched gas and entrained liquid droplets discharges into a flooded elbow or liquid retention chamber which serves to collect the liquid phase as well as wetted or entrained solids, and also serves to divert the quenched gas stream into horizontal flow while preventing abrasion. Another advantage is that the apparatus provides an expansion joint effect, since gas-tight sealing is attained between elements by means of a water seal.

It is an object of the present invention to provide an improved apparatus for the quenching of a hot gas stream.

Another object is to provide a gas quenching apparatus through which the gas stream flows with low pressure drop.

A further object is to provide an apparatus for effectively quench-scrubbing a hot solids-laden gas stream.

An additional object is to provide an apparatus for quenching a hot solids-laden gas stream in which the surfaces exposed to the wetted gas are irrigated with down-flowing liquid films, so as to prevent solids deposition and caking.

Still another object is to provide an apparatus for gas quenching with integral lower liquid retention chamber in the form of a flooded elbow, so that change in gas flow from vertically downwards to horizontal takes place in contact with a body of liquid.

Still another object is to provide an apparatus for gas quenching which includes a water seal between spaced apart elements, to provide a thermal expansion joint.

These and other objects and advantages of the present invention will become evident from the description which follows.

Description of the drawings and preferred embodiments

Figure 2:
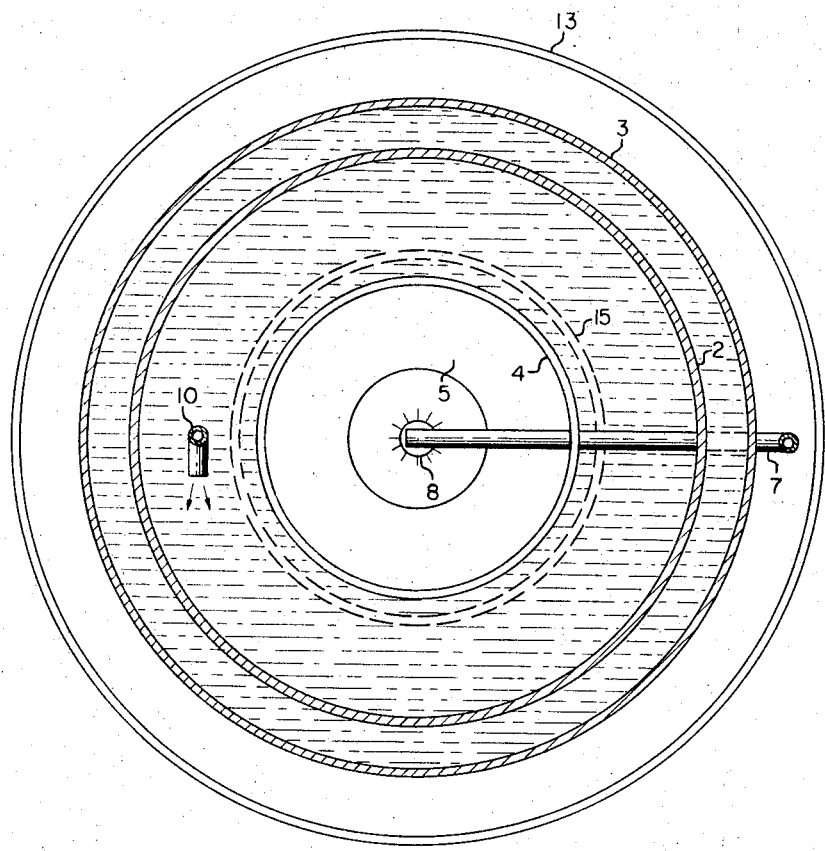
Figure 3:
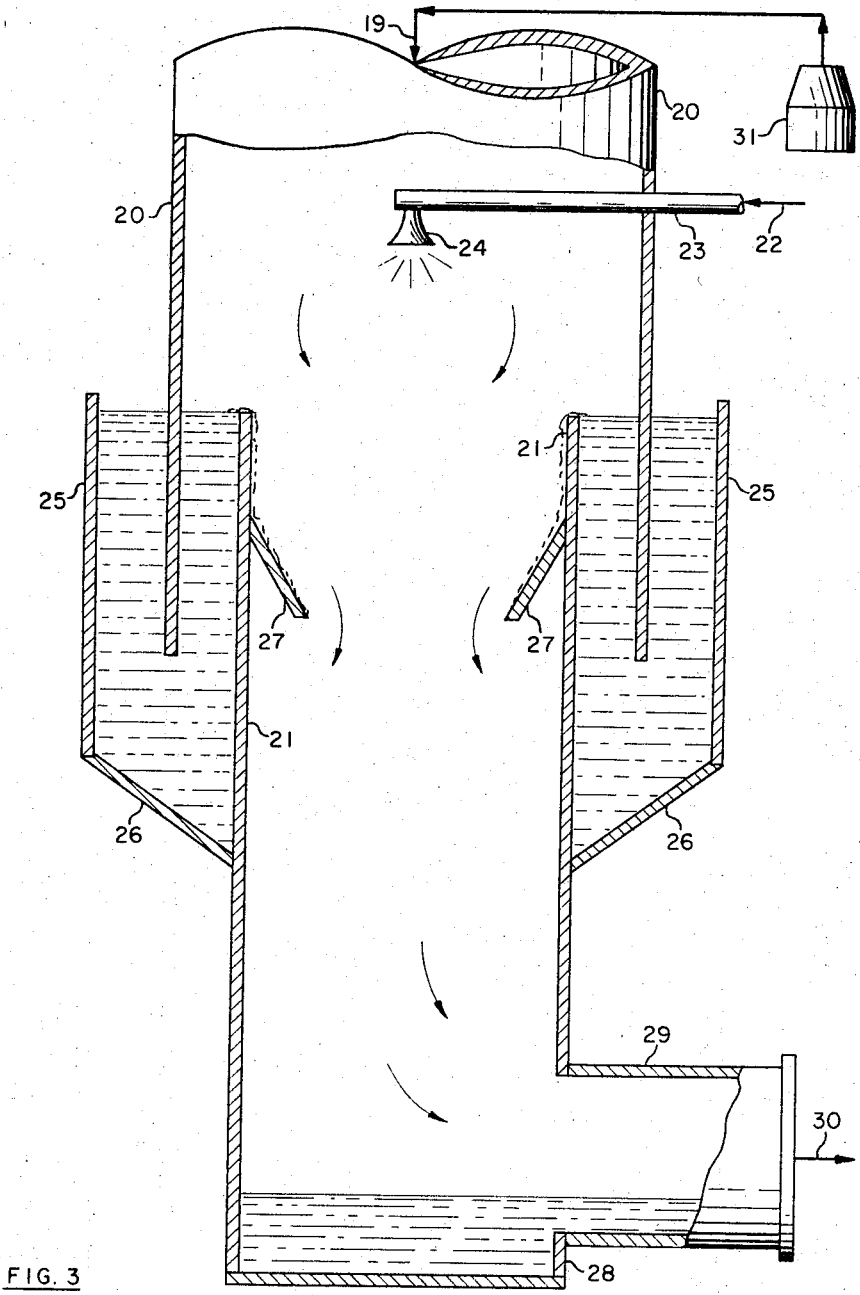

Referring to the drawings:

FIGURE 1 is a sectional elevation view of a preferred embodiment of the gas quencher apparatus of the present invention, FIGURE 2 is a sectional plan view of FIGURE 1, taken on section 2—2, and FIGURE 3 is a sectional elevation view of an alternative embodiment of the invention.

Referring now to FIGURE 1, the hot solids-laden gas stream 1 derived from a gas source such as a metallurgical furnace, not shown, is passed downwards through the vertically oriented conduit 2. An external water jacket 3 will usually be provided about the outer periphery of conduit 2, in order to cool conduit 2 and thus protect conduit 2 against adverse effects such as sealing due to the highly elevated temperature of stream 1. Water or other cooling fluid is circulated through the annular space between conduit 2 and jacket 3 by means not shown. A vertical conduit 4 is coaxially aligned within conduit 2 and extends downwards within a portion of conduit 2. An inverted frusto-conical baffle 5 depends downwards and inwards from the lower end of conduit 4 and terminates at a lower central opening. The gas stream 1 flowing downwards through conduit 2 is diverted centrally into conduit 4 and is highly accelerated in velocity by baffle 5.

A liquid water stream 6 is passed through supply duct 7, which extends horizontally through conduits 2 and 4 and terminates at the central spray nozzle 8, which sprays water stream 6 centrally and downwards into the downflowing gas stream within conduit 4 and above baffle 5 to provide a partial quenching effect. Additional water is passed via stream 9 and duct 10 into the annular liquid retention space between conduits 2 and 4 and above baffle 11, which extends outwards from the lower part of conduit 4 to the inner wall of conduit 2. Water stream 9 thus fills the liquid retention space between conduits 4 and 2, and flows inwards over the upper edge of baffle 4 and downwards as a liquid film on the inner walls of conduit 4 and baffle 5, thus serving to irrigate these walls and prevent solids deposition. The downflowing liquid film is then projected from the lower end of baffle 5 and at the central opening, into the highly accelerated downflowing gas stream. The water film is thus dispersed into liquid droplets adjacent to the central opening in baffle 5, and is uniformly distributed into the gas stream to provide a uniform and total quenching effect, together with at least partial scrubbing and removal of entrained solid particles if present.

Returning to the annular liquid retention space or chamber above baffle 11, the openings or holes 12 are provided in the wall of conduit 2 below the vertical level of the upper end of conduit 4, and above the baffle 11, so that a portion of stream 9 flows through the holes 12 and down the outer surface of conduit 2. The downflowing water discharged outwards from openings 12 thus fills the annular space within the outer conduit 13, which is generally vertically oriented and substantially coaxial with conduit 2, and above the liquid retention baffle 14. The baffle 14 extends from the lower end of conduit 13 to the outer wall of conduit 15, which is vertically oriented and coaxially aligned with conduit 2, and extends downwards below baffle 11 and within the lower part of conduit 2 to a lower terminus below the lower end of conduit 2. The water flowing outwardly through openings 12 and downwards on the outer surface of conduit 2, flows downwards through the annular space between conduits 13 and 2, inwards below the lower end of conduit 2, upwards between conduit 2 and conduit 15, inwards over the upper end of conduit 15, and downwards as a liquid film on the inner wall of conduit 15.

The mixed gas-liquid stream discharged downwards from the central opening in baffle 5 flows downwards through conduit 15, and due to the provision of the liquid film on the inner surface of conduit 15, an irrigated or wetted-wall surface is provided within conduit 15 and the accumulated deposition or buildup of solids on the inner wall of conduit 15 is effectively prevented. The lower terminal portion of conduit 15 is provided with downward extension 16, which serves to define a lower terminal liquid retention chamber at the bottom terminus of conduit 15. A fluid removal conduit 17 extends substantially horizontally from the lower end of conduit 15, so that extension 16 defines a flooded elbow, with liquid accumulation taking place at the bottom of conduit 15 defined by extension 16. Conduit 17 extends horizontally from a side opening in conduit 15 between extension 16 and baffle 14, and passes the quenched gas stream 18 and excess liquid water to suitable disposal means, such as a gravity-type cyclonic gas-liquid separator, not shown, from which the liquid phase may be discharged to waste or recycled via stream 6 and 9. The quenched and scrubbed gas phase stream 18 may be discharged to atmosphere, or in some cases stream 18 will contain a major proportion of carbon monoxide and may be employed as a fuel or in chemical manufacture, such as in the production of hydrogen by the catalytic water gas shift reaction.

The upper part of the apparatus, including conduit 2 and associated elements, is free to expand vertically or laterally, since conduit 2 extends to the water seal defined between conduits 13 and 15. Thus, the lower end of conduit 2 extends to a water seal which is in effect a thermal expansion joint, which attains gas-tight water sealing while permitting elongation or lateral expansion of conduit 2 due to variable thermal effects.

FIGURE 2 is a sectional plan view of the apparatus, taken on section 2—2 of FIGURE 1, and illustrates the concentric and coaxial arrangement of the several cylindrical conduits employed in the preferred apparatus combination of FIGURE 1.

Referring now to FIGURE 3, an alternative and less complex embodiment of the invention is presented, which provides for gas quenching, together with a combination water seal and thermal expansion joint, and a lower flooded elbow. The hot gas stream 19, derived from a hot gas source such as furnace 31, flows downwards through the vertically oriented conduit 20, and is diverted inwards and into conduit 21, which is vertically oriented and extends coaxially downwards from within the lower part of conduit 20. Water stream 22 is passed by substantially horizontal duct 23 to spray nozzle 24, which is centrally oriented within conduit 20. Stream 22 is sprayed downwards and outwards from nozzle 24 into the downflowing gas stream 19 within conduit 20 and above conduit 21. A portion of the water spray discharged from spray nozzle 24 flows into the annular space between conduits 21 and 20, and the annular chamber between conduits 21 and outer conduit 25 is thus filled with water. The lower end of conduit 20 terminates between conduits 21 and 25 and within the body of water retained by lower baffle 26, which extends between the lower end of conduit 25 and conduit 21. Thus, a water seal against gas leakage between conduits 20 and 21 is provided, and the water seal permits lateral and vertical thermal expansion of conduit 20 relative to conduit 21.

The excess water, which flows from nozzle 24 into the annular space between conduits 21 and 20, next flows over the upper edge of conduit 21, since the vertical elevation of the upper terminus of conduit 21 is lower than the upper end of conduit 25. The excess water next flows downwards on the inner surfaces of conduit 21 and inverted frusto-conical baffle 27, which is mounted within conduit 21 and is provided with a central opening through which the gas stream flows with accelerated velocity. The downflowing liquid film is projected into the gas stream at the lower end of baffle 27, and the mixed gas-liquid stream flows downward through the lower portion of conduit 21 below baffle 27. A lower terminal extension of conduit 21, defined by extension leg 28, is provided in order to retain a body of water or flooded elbow at the bottom of conduit 21. Excess water and the quenched gas stream are horizontally discharged from conduit 21 via substantially horizontal conduit 29 as stream 30.

Numerous alternatives within the scope of the present invention will occur to those skilled in the art. In some instances, the cooling jacket 3 may be omitted, or alternatively an inner refractory lining may be provided on the inner surface of conduit 2. Alternative liquid entry and spray means may be provided instead of duct 7 and spray nozzle 8, such as a central axial pipe. The lower end of baffle 5 may be provided with an inwardly extending substantially horizontal lip in some instances, to assist in projection of the downflowing liquid film into the accelerated gas stream. The openings 12 may be omitted in some cases, with an auxiliary water supply duct being provided which terminates between conduits 2 and 13, so as to supply water to the annular space between conduits 13 and 15 and thus provide water flow and irrigation on the inner wall of conduit 15. The upper end of conduit 15 is preferably juxtaposed with the lower end of baffle 5, and as shown on FIGURE 1, the upper end of conduit 15 preferably terminates at the same horizontal plane as the lower end of baffle 5. The upper end of conduit 15 may alternatively be in a horizontal plane above or below the lower end of baffle 5. The upper end of conduit 15 will be spaced below baffle 11 in vertical elevation, however the conduit 15 may be of a variable diameter and may be oriented directly below baffle 11, or alternatively directly below baffle 5. Means not shown may be provided to periodically or continuously remove a portion of the liquid phase from the lower extension 16 of the conduit 15, so as to remove accumulated solids from extension 16 together with the liquid phase. The conduits of the present invention are preferably cylindrical and coaxial, so as to define concentric circles in horizontal section as shown in FIGURE 2. In some instances however, the conduits may be square or rectangular in horizontal cross-section, but in most instances the several conduits will be coaxial for optimum results. When the conduits are rectangular, a plurality of spray nozzles such as element 8 will be provided, aligned in a linear row along the longer axis of the rectangle defined by conduit 4.

Various alternatives may also be practiced with respect to the apparatus arrangement of FIGURE 3. Thus, conduit 20 may be provided with an external water jacket similar to element 3 of FIGURES 1 and 2. The duct 23 may extend horizontally to a vertically downward extending terminal section which would be coaxial with conduit 20, with the spray nozzle 24 being mounted on the lower end of the extension. The spray nozzle 24 may be disposed centrally within the upper section of conduit 21 above baffle 27, in which case auxiliary means similar to conduit 10 of FIGURE 1 would be provided to pass water into the annular space between conduits 21 and 25. In some instances, baffle 27 may extend inwards and downwards from a connection with the upper end of conduit 21, in which case the water flowing over the upper end of conduit 21 would flow directly onto the upper surface of baffle 27 since the upper end of the baffle 27 would terminate at the upper end of conduit 21.

We claim:

1. An apparatus for quenching a hot solids-laden gas stream derived from a gas source such as a furnace or the like which comprises a first vertical conduit, said first conduit extending downwards from gas source, whereby said hot solids-laden gas stream flows vertically downwards through said first conduit, a second vertical conduit, said second conduit being coaxially aligned within the lower portion of said first conduit and extending downwards to a lower terminus below the lower end of said first conduit, an inverted frusto-conical baffle, said baffle extending inwards and downwards from the inner wall of said second conduit and terminating at a central opening, a third vertical conduit, said third conduit being substantially coaxial with and external to the lower portion of said first conduit, with the upper end of said third conduit terminating at a vertical elevation above the upper end of said second conduit, an annular baffle, said annular baffle extending outwards from the outer wall of said second conduit to the lower end of said third conduit, said first conduit terminating above said annular baffle, centrally disposed means within said first conduit and above said second conduit to spray water downwards and outwards into said gas stream above said second conduit, whereby a portion of the sprayed water descends into the annular space between said second conduit and said first conduit and thereby fills the annular space between said second conduit and said third conduit and above said annular baffle, and whereby excess water flows inwards over the upper end of said second conduit, and downwards as a liquid film on the inner surface of said inverted frustoconical baffle, and is projected into the accelerated gas stream at the central opening of said baffle, a lower terminal liquid retention chamber at the bottom terminus of said second conduit, and a fourth conduit, said fourth conduit extending substantially horizontally from the lower end of said second conduit and between said lower terminal liquid retention chamber and said annular baffle, to means for disposal of quenched gas and excess water.

2. The apparatus of claim 1, in which means are provided to pass additional water into the annular space between said second conduit and said third conduit.

3. The apparatus of claim 1, in which said centrally disposed means within said first conduit to spray water downwards and outwards into said gas stream comprises a water supply duct, said duct extending horizontally into said first conduit above said second conduit and terminating at a downwardly oriented central spray nozzle, together with means to pass water through said duct, whereby water is sprayed centrally downwards and outwards into said gas stream from said spray nozzle and above said second conduit.

4. The apparatus of claim 1, in which said inverted frusto-conical baffle extends inwards and downwards from the upper end of said second conduit.

5. An apparatus for quenching a hot solids-laden gas stream derived from a gas source such as a furnace or the like which comprises a first vertical conduit, said first conduit extending downwards from said gas source, whereby said hot solids-laden gas stream flows vertically downwards through said first conduit, a second vertical conduit, said second conduit being coaxially aligned with and extending within a portion of said first conduit, a first annular baffle, said first baffle extending between the lower part of said second conduit and the inner wall of said first conduit, an inverted frusto-conical baffle, said inverted frusto-conical baffle depending downwards and inwards from the lower end of said second conduit and terminating at a lower central opening, means to pass water into the annular liquid retention space between said first conduit and said second conduit and above said first baffle, whereby said water flows inwards over the upper edge of said second conduit and downwards as a liquid film on the inner wall of said second conduit and said depending baffle and is projected into said gas stream at the central opening in said depending frusto-conical baffle, centrally disposed means within said second conduit to spray water downwards and into said gas stream within said second conduit and above said depening frusto-conical baffle, a third vertical conduit, said third conduit being coaxially aligned with said first conduit and extending downwards below said first annular baffle and within said first conduit to a lower terminus below the lower end of said first conduit, a fourth vertical conduit, said fourth conduit being substantially coaxially aligned with said first conduit and extending downwards external to said first conduit to a lower terminus below the lower end of said first conduit and above the terminus of said third conduit, a second annular baffle, said second baffle extending below the lower end of said first conduit and between the lower end of said fourth conduit and the outer wall of said third conduit, means to pass water into the annular space between said first conduit and said fourth conduit, whereby said water flows downwards between said first conduit and said fourth conduit, inwards below the lower end of said first conduit, upwards between the lower end of said first conduit and the upper end of said third conduit, and downwards as a liquid film on the inner wall of said third conduit, a lower terminal liquid retention chamber at the bottom terminus of said third conduit, and a fifth conduit, said fifth conduit extending substantially horizontally from the lower end of said third conduit and between said lower terminal liquid retention chamber and said second annular baffle, to means for disposal of quenched gas and excess water.

6. The apparatus of claim 5, in which said first conduit is provided with an external water jacket which terminates vertically below the upper end of said second conduit.

7. The apparatus of claim 5, in which said centrally disposed means within said second conduit to spray water downwards and into said gas stream within said second conduit and above said depening frusto-conical baffle comprises a water supply duct, said duct extending horizontally into said second conduit and terminating at a downwardly oriented central spray nozzle, together with means to pass water through said duct, whereby water is sprayed centrally and downwardly into said gas stream from said spray nozzle.

8. The apparatus of claim 5, in which said means to pass water into the annular space between said first conduit and said fourth conduit comprises at least one opening in the wall of said first conduit, said opening being spaced vertically below the upper end of said second conduit, whereby water flows outwards through said opening from said annular liquid retention space defined between said first conduit and said second conduit and above said first baffle, and downwards on the outer surface of said first conduit.

9. The apparatus of claim 5, in which the upper end of said third conduit is juxtaposed with the lower end of said inverted frusto-conical baffle and terminates at the same horizontal plane as the lower end of said inverted frusto-conical baffle.

10. An apparatus for quenching a hot solids-laden gas stream derived from a gas source such as a furnace or the like which comprises a first vertical cylindrical conduit, said first conduit extending downwards from said gas source, whereby said hot solids-laden gas stream flows vertically downwards through said first conduit, a second vertical cylindrical conduit, said second conduit being coaxially aligned with and extending within a portion of said first conduit, a first annular baffle, said first baffle extending outwards from the lower part of said second conduit to the inner wall of said first conduit, an inverted frusto-conical baffle, said inverted frusto-conical baffle depending downwards and inwards from the lower end of said second conduit and terminating at a lower central opening, means to pass water into the annular liquid retention space between said first conduit and said second conduit and above said first baffle, whereby said water flows inwards over the upper edge of said second conduit and downwards as a liquid film on the inner wall of said second conduit and said depending baffle and is projected into said gas stream at the central opening in said depending frusto-conical baffle, a water supply duct, said duct extending horizontally into said second conduit and terminating at a downwardly oriented central spray nozzle, means to pass water through said duct, whereby water is sprayed centrally and downwardly into said gas stream from said spray nozzle within said second conduit and above said depending frusto-conical baffle, a third vertical cylindrical conduit, said third conduit being coaxially aligned with said first conduit and extending downwards below said first annular baffle and within said first conduit to a lower terminus below the lower end of said first conduit, a fourth vertical cylindrical conduit, said fourth conduit being coaxially aligned with said first conduit and extending downwards external to said first conduit to a lower terminus below the lower end of said first conduit and above the terminus of said third conduit, a second annular baffle, said second baffle extending below the lower end of said first conduit and between the lower end of said fourth conduit and the outer wall of said third conduit, at least one opening in the wall of said first conduit, said opening being spaced vertically below the upper end of said second conduit, whereby water flows outwards through said opening from said annular liquid retention space defined between said first conduit and said second conduit and above said first baffle, and downwards on the outer surface of said first conduit, to the annular space between said first conduit and said fourth conduit, said water derived from said opening thereafter flowing downwards between said first conduit and said fourth conduit, inwards below the lower end of said first conduit, upwards between the lower end of said first conduit and the upper end of said third conduit, and downwards as a liquid film on the inner wall of said third conduit, a lower terminal liquid retention chamber at the bottom terminus of said third conduit, and a fifth conduit, said fifth conduit extending substantially horizontally from the lower end of said third conduit and between said lower terminal liquid retention chamber and said second annular baffle, to means for disposal of quenched gas and excess water.

11. The apparatus of claim 10, in which said first conduit is provided with an external water jacket which terminates vertically below the upper end of said second conduit.

12. The apparatus of claim 10, in which the upper end of said third conduit is juxtaposed with the lower end of said inverted frusto-conical baffle and terminates at the same horizontal plane as the lower end of said inverted frusto-conical baffle.

References Cited

UNITED STATES PATENTS

| | | |
|---|---|---|
| 3,131,237 | 4/1964 | Collins. |
| 3,212,761 | 10/1965 | Willett. |
| 3,317,197 | 5/1967 | Lohner et al. |

HARRY B. THORNTON, *Primary Examiner.*

TIM R. MILES, *Examiner.*